Nov. 21, 1967 G. BARKER 3,353,315
GROOVED PANEL WITH LOAD-BEARING STRIPS
Filed March 12, 1965 5 Sheets-Sheet 3

GEORGE BARKER
by E. M. Squire
his attorney

Nov. 21, 1967          G. BARKER          3,353,315

GROOVED PANEL WITH LOAD-BEARING STRIPS

Filed March 12, 1965          5 Sheets-Sheet 5

GEORGE BARKER by E. M. Squire his attorney 3,353,315
GROOVED PANEL WITH LOAD-BEARING STRIPS
George Barker, 7 Ash Grove, Willerby, Hull, England
Filed Mar. 12, 1965, Ser. No. 439,281
Claims priority, application Great Britain, Sept. 30, 1964,
39,776/64; Jan. 25, 1965, 3,200/65
15 Claims. (Cl. 52—275)

ABSTRACT OF THE DISCLOSURE

Structures employing slabs of mechanically weak material having low thermal conductivity such as plastic foam. The faces of the slabs are grooved to receive load-bearing strips of relatively mechanically strong material so that a strong composite panel of light weight and low thermal conductivity is obtained. Various arrangements of a plurality of composite panels are disclosed.

In order to obtain the advantages of the high thermal insulation of plastic materials such as polystyrene it has been proposed to use slabs of such materials in expanded form in building operations and to apply to such slabs a surface layer of plaster or concrete or other sheeting, but the application of such prepared slabs is limited and unsafe where there is any fire risk as the plastic material may melt and cause failure of the structure.

There have also been many proposals to provide building panels based on having a grid or honeycomb of rigid material with a surface layer or filling or both filling and surface layer of plastic material and/or plaster, concrete or the like. Here again, there is a limitation in the application of such panels due to difficulty in connecting together such panels and their connection to essential major structural members, and when this difficulty is reduced by providing timber framing it is necessary to employ skilled carpenters for building construction.

The panels must carry and transmit some structural loads so that slabs of say, expanded polystyrene material, cannot as such be directly used in building operations, as in the fabrication of walls, and such slabs with preformed frames and surface layers are difficult to handle, apart from their weight, and require skilled operators.

Now, therefore, the object of the present invention is to provide light-weight thermal insulating and space filling structural panels for building purposes which may be factory made and directly used by building operatives having a minimum of skill due to a combined lightness of weight with rigidity and easy interconnection of panels to one another and to structural members, in the construction of buildings to provide true surfaces for internal and external surfacing or cladding.

The structural panel according to the present invention comprises a slab of light-weight material, such as expanded polystyrene or equivalent plastic material, or manufactured timber such as chip-board or thick straw board and such like (hereinafter called "slab") having in one surface mutually perpendicular series of crossing parallel grooves formed in one face in which are located elongated members or strips (hereinafter called "strips") of harder or mechanically stronger material having slots at the respective intersections for mutual locking engagement and having in its other surface either similar aligned or off-set crossing grooves and strips or parallel grooves extending in the same direction as and aligned or off-set with respect the grooves in one direction in the other surface and similarly containing strips of mechanically stronger material.

Figure 1:
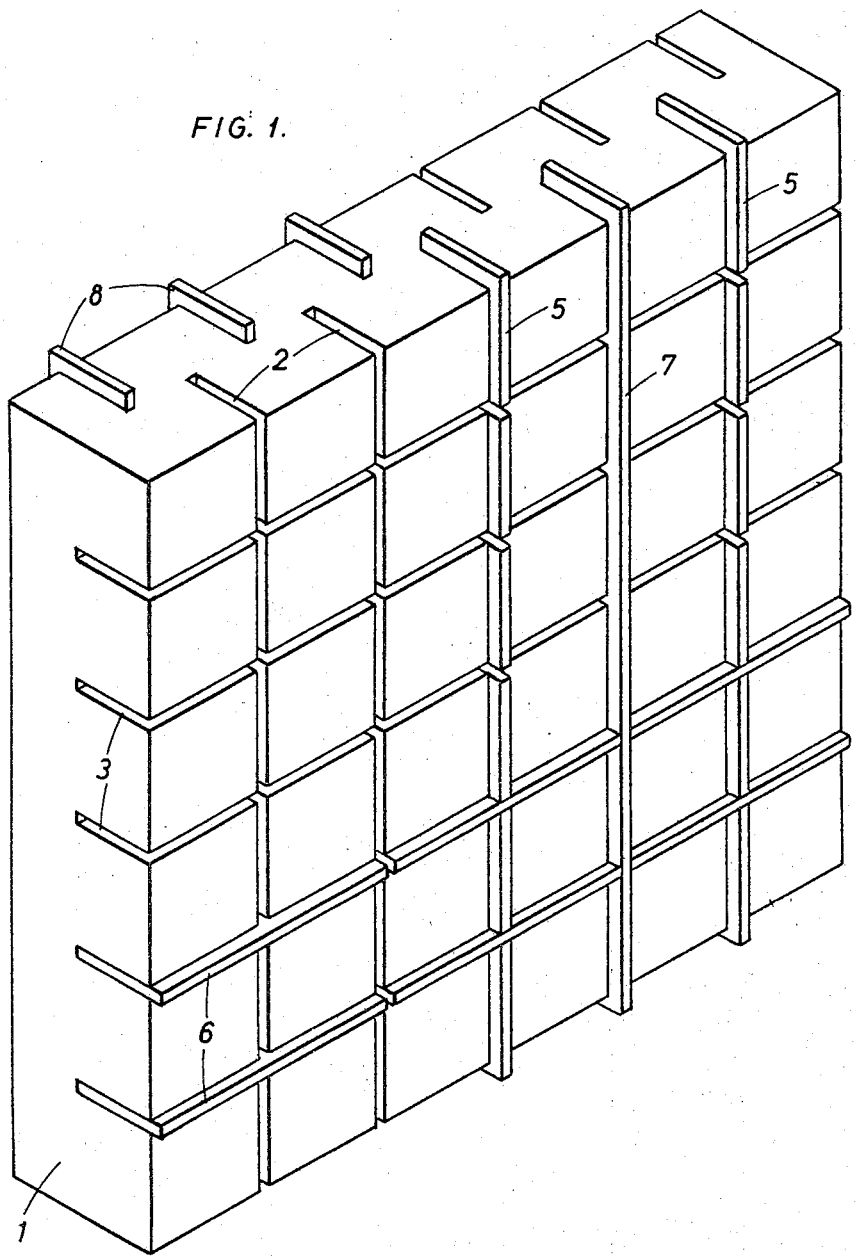

FIG. 1 is a perspective view showing the obverse face of a panel having crossing parallel grooves some of which are shown provided with the interlocking crossing strips.

Figure 2:
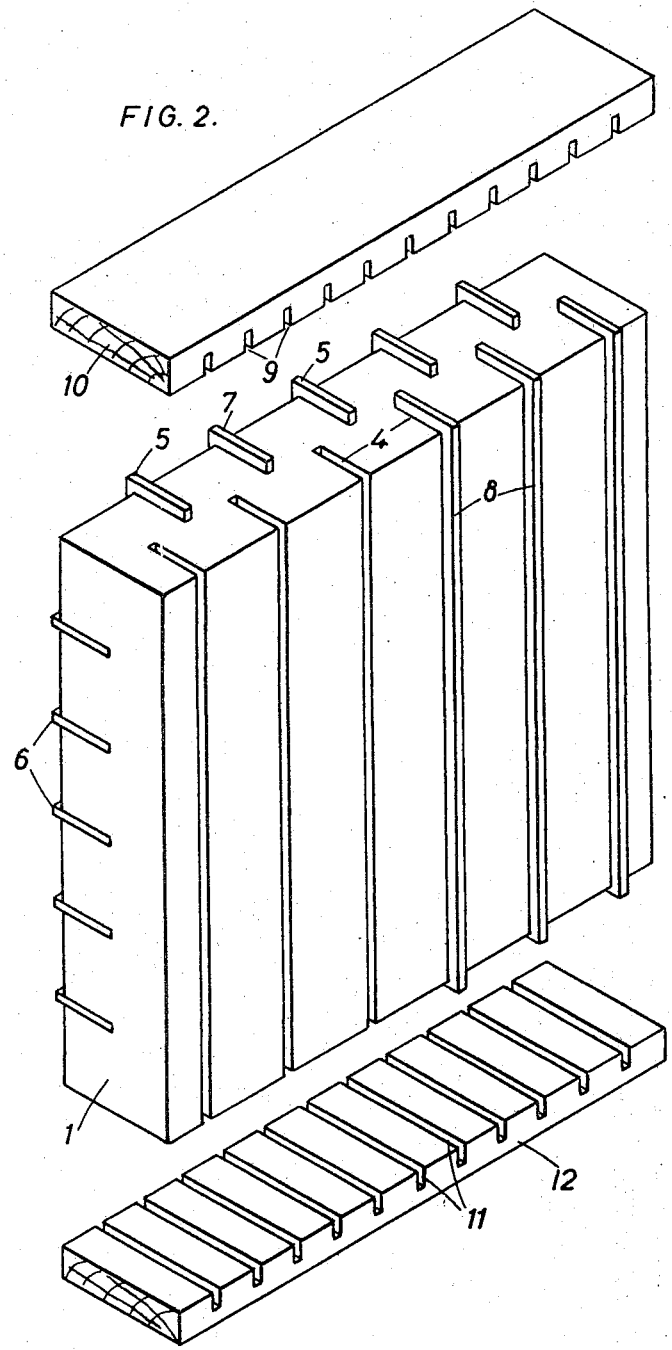
Figure 3:
Figure 4:
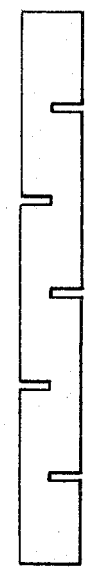
Figure 5:
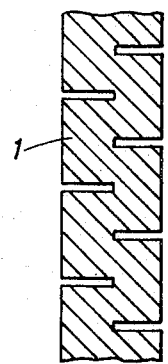
Figure 6:
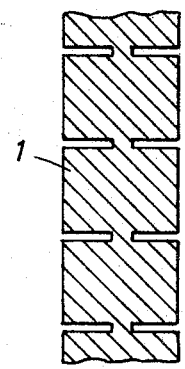
Figure 7:
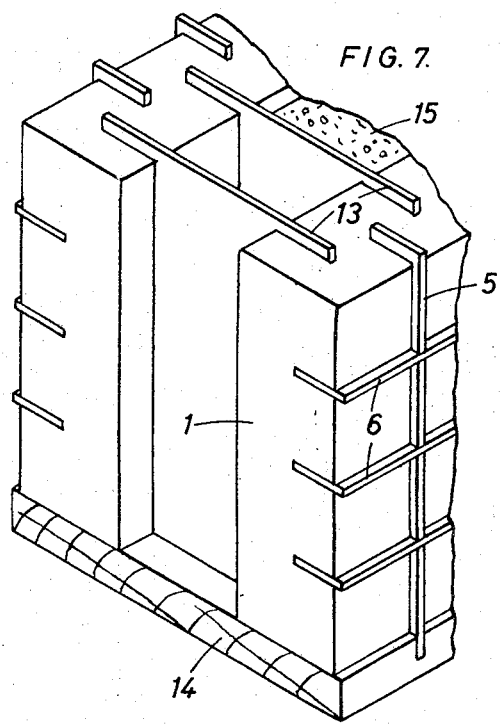
Figure 8:
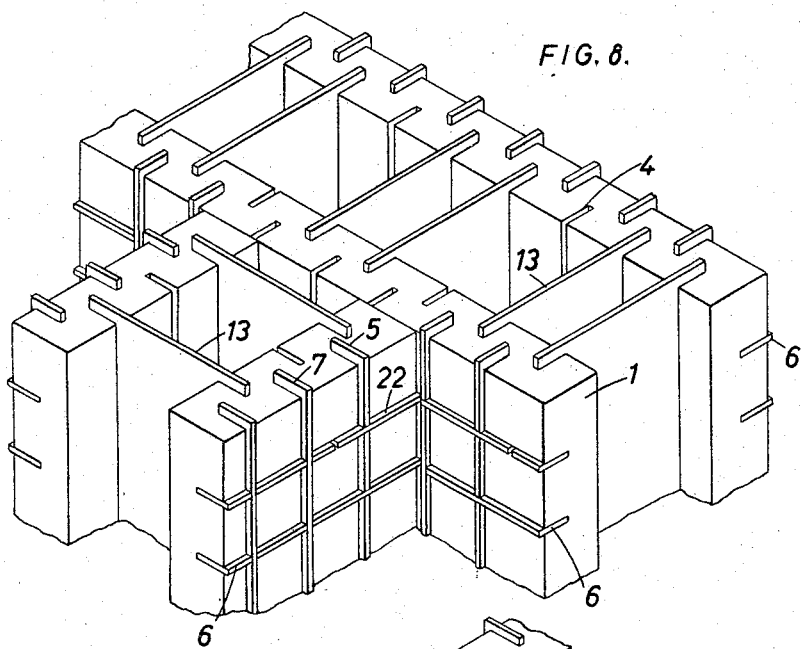
Figure 9:
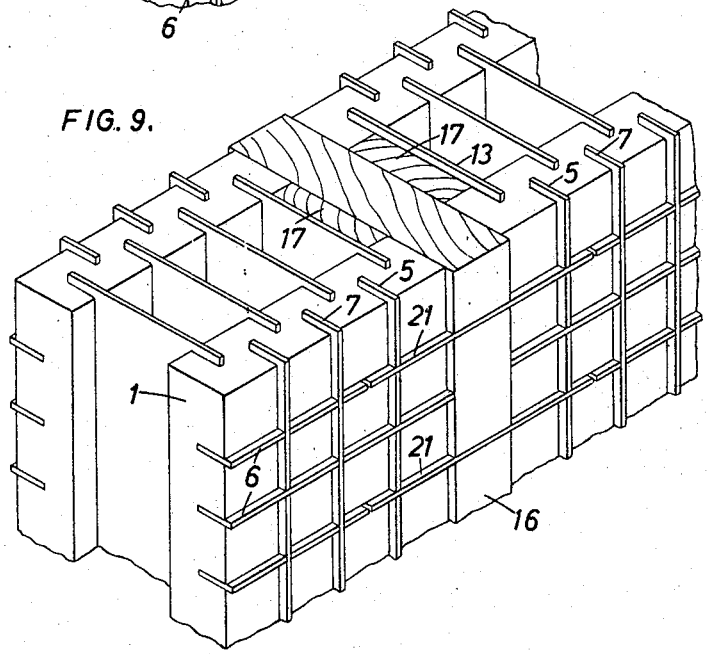
Figure 10:
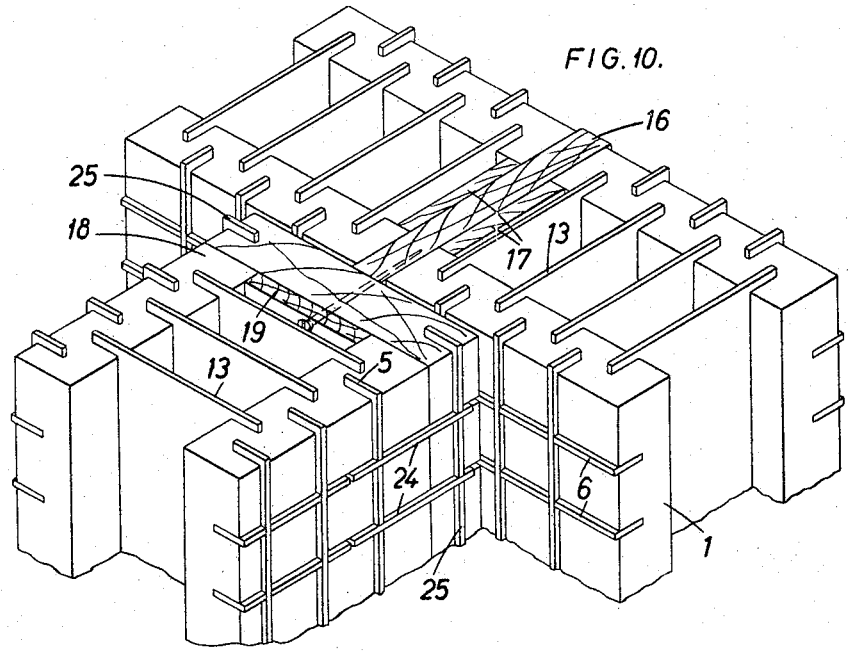
Figure 11:
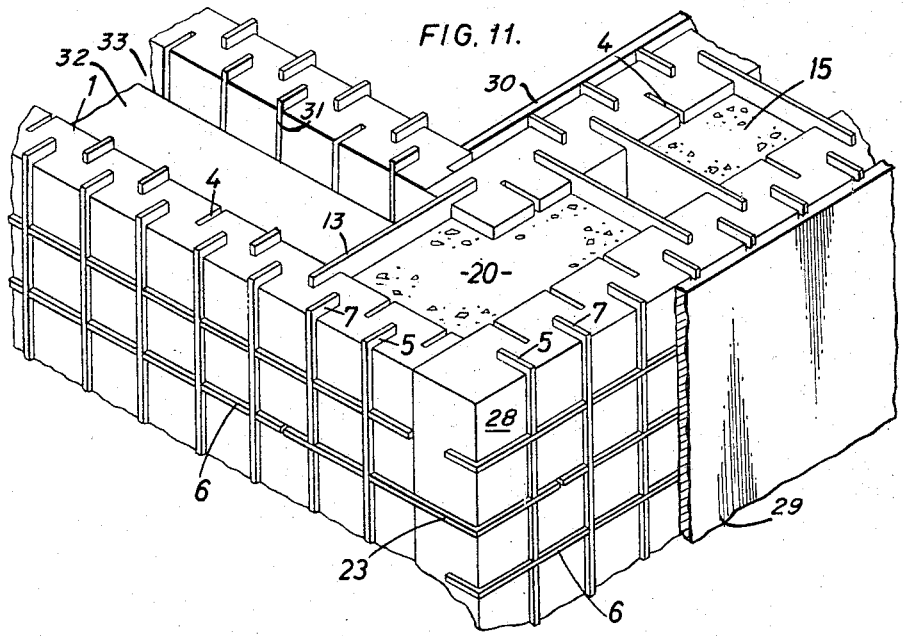

FIG. 2 is an exploded perspective view showing the reverse face of one embodiment of the panel of FIG. 1, additionally including top and bottom slotted load transmitting members, FIG. 3 shows a strip with slots extending in from one edge only, FIG. 4 shows a strip with staggered slots extending in from opposite edges, FIG. 5 is a transverse fragmentary sectional view of a panel having grooves in opposite faces arranged in off-set or staggered relation, FIG. 6 is a view similar to FIG. 5, showing a panel having the grooves in alignment, FIG. 7 is a fragmentary perspective view of a double panel formed by a combination of two of the panels of FIGS. 1 and 2 with some of the strips wider and common to the two panels, FIG. 8 is a fragmentary perspective view showing the junction of two double panels in T relation, FIG. 9 is a fragmentary perspective view showing the edges of two aligned double panels abutting and connected to a rigid member such as wooden column, FIG. 10 is a fragmentary perspective view (similar to FIG. 8) showing an example of a conjunction of three double panels with rigid members, and FIG. 11 is a perspective of two double panels as in FIG. 7 connected together at right angles to form a corner and showing also how such double panels and their common spacing strips may be used to form in situ cast concrete columns.

Referring now to the said drawings, throughout which like parts are identified by like reference numerals, and in particular to FIGS. 1 and 2 the main component of a panel is a slab 1, of expanded polystyrene or other plastic material, chip board or other such light-weight manufactured material, which slab is provided in at least one of its surfaces with a series of mutually perpendicular intersecting grooves 2 and 3 at regular spacing and parallel to the respective opposed edges of the slab 1 as shown in FIG. 1. The material of slab 1 is of low thermal conductivity and low mechanical strength. The other surface of the slab 1 either has a similar arrangement of crossing grooves or as shown in FIG. 2 has in that surface a single series of parallel grooves 4. The grooves in the opposite surfaces of the slab may be in off-set or staggered relation as shown in FIG. 5 or in alignment as shown in FIG. 6.

In the crossing grooves first and third series of grooves 2, 3 strips are placed to form a grid, while in the second series of grooves 4 are placed strips of the same width or of greater width as hereinafter described. Such strips are made of metal, wood, fibre board or other suitable material of greater mechanical strength than the material of the slab 1 and such strips which interengage each other have half width slots either extending in from opposite edges as shown in FIG. 4 or from only one edge as shown in FIG. 3.

In FIG. 1 some of the strips are shown in position. The strips 5 of the first series (in alternate grooves) are of the form shown in FIG. 3 with their slots facing outwards and are first placed in appropriate grooves 2. All the strips 6 of the third series in the grooves 3 at right angles to the grooves 2 are of the form shown in FIG. 4 and are positioned with the slotted portions thereof cooperating with the slots in the strips 5. The intermediate strips 7 of the first series, also of the form shown in FIG. 3, are finally positioned in the like disposition to the alternate strips 5 but with their slots facing inwards so that the edges of the strips 5, 6 and 7 all lie in a common plane. Such edges of the strips may be below the surface of the slab, flush therewith, or as shown and preferred, projecting therebeyond. It is further preferred that at least the strips 5 and 7 of the first series, have at least at one end projecting beyond the edge of the slab 1, substantially as illustrated.

In the opposite surface of the slab there may be a like arrangement of crossing grooves 2, 3 with strips 5, 6 and 7 or, as shown in the embodiment of FIG. 2 that surface has only single series of parallel grooves 4 of the second series in which are located strips 8 which do not have any slots. The ends of the strips 8 of the second series, at one or both ends, project beyond the edge of the slab 1 to match the strips 5 and 7 of the first series.

At the top the projecting ends of the strips 5 and 7 of the first series or of the strips 5, 7 and 8 of the first and second series as the case may be, extend into slots 9 of a rigid, for example wood, upper end 10 (FIG. 2) which distributes loads applied thereto to such strips. When the strips also project beyond the lower edge of the slab they extend in slots 11 in a rigid lower end member 12.

A single panel comprises a slab 1 with crossing grooves 2, 3 in at least one of its surfaces and may be used for internal walls or partitions in conjunction with the end members 10 and 12 and also with vertical structural column members or external walls. Such single panel or a partition comprising a plurality of individual panels in edge-to-edge relation, after erection, is given a surface coating on both sides by sheets of fibre board, plywood, plastic material, plaster board or the quivalent, which may be affixed or adhered to the edges of the strips or, when the edges of strips are flush with the surface of the slab 1, to the edges of such strips and the surface of the slab therebetween.

A panel may be some three, four or more feet wide, and some five, six or more feet long with a slab thickness of some two and a half inches to some three and a half inches.

It is preferred to provide a double panel as illustrated in FIG. 7 which comprises two of the panels previously described which are held in spaced parallel relation by a plurality of wider strips 13 which are located in at least some of the grooves 4 or in some of the grooves 2 and, where the strips 5 and 7 project beyond the upper and lower edges of the slab 1, likewise projecting beyond such edges. The strips 13 are without slots in their edges when used alone or in combination with the strips 8 but have slots when they, and strips 8, are to cooperate with strips located in grooves (similar to the grooves 3) at right angles thereto. Such double panels may cooperate with rigid upper and lower end members, corresponding to the members 10 and 12, such as the lower end member 14 which is of appropriate width to the double panel and suitably grooved.

The double panels of FIG. 7 may be factory made or constructed at the building site where they may be so assembled (FIGS. 9 and 10) that vertical structural members such as the uprights of a frame are located in spaces between the two slabs 1 and adjacent spacing strips 13. Additionally or alternatively such spaces may form the mould for receiving concrete for forming an upright column 15 (FIGS. 7 and 11).

An example of double panels disposed at right angles to one another in T form is illustrated in FIG. 8. An example of two double panels in alignment is illustrated in FIG. 9 in an arragement in which the panels abut a structural member such as the wooden column member 16 which may form part of a framework. Such member 16 may have a strip 17 on one or both sides which can enter between the slabs 1 of a double panel and the end spacer strip 13 to locate and hold the panel(s) in position of use. Spaces between spacers 13 may again be used for forming concrete columns, as in FIG. 7. An example of a double panel at right angles to two other such panels, in an arrangement similar to FIG. 9 is illustrated in FIG. 10 where an upright 18 with its strip 19 (similar to the strip 17) is shown secured to the member 16.

An example of double panels at right angles to one another to form a corner is shown in FIG. 11 and in an arrangement in which concrete is cast between the slabs of the two panels and their end spacers 13 to form a corner column 20 in addition to columns 15 formed between slabs and their spacers 13. In this embodiment, for example, the upper ends of spacers 13, in particular those between those forming columns 15, may be cut back or shortened and bridged to form a horizontal channel between the slabs of the double panels in which concrete may be cast in conjunction with that of the column 15 (or 15 and 20) to form say a ring beam of a structural concrete framework of a building.

An important feature of the construction of the panels, both as single and double panels is ease of connection by the simple expedient of using a short length of strip, similar to the strips of the panels, as a straight length or right angle piece with like half width slots in one of its edges. The use of such straight connecting strip, for connecting aligned panels to one another and/or to a structural member provided with grooves is also shown in FIG. 9 where short horizontal strips 21 are located in some of the grooves 3 and in similar grooves in the member 16 for their slots to co-operate with the slots of the vertical strips 5, the strips 6 being shortened or cut back to provide accommodation for the short locking strips 21. The locking strips 21 may be longer and have slots extending in from both edges so that they may be locked in position by strips 7. The use of a right-angle locking piece is illustrated in FIG. 8 where the rectangular piece 22 has slots in its longer edges and is located in a groove 3 to co-operate with the strips 5 of the outer slabs of the two double panels at right angles to one another. The use of a rectangular locking strip 23 with slots in its shorter edges is shown in FIG. 11, where an edge extension of a groove 3 is provided to accommodate the strip 23 and such strip co-operates with the strips 5.

Another use of the straight locking strip is shown in FIG. 10 where strips 24 co-operate with a strip 5 of a slab and with a strip 25 specially provided on the column member 18. Other sub-structures such as window, door and like frames may be grooved, or grooved and provided with a strip 25, for such locking of an abutting panel by means of a locking strip.

In FIG. 11 double panels are shown, as in the construction of the walls of a building, and the external surface 28 of such wall is given a cladding 29 of cementitious material for outdoor use applied wet in one, two or more layers while the internal surface is covered with a sheeting 30 of material for indoor use such as plaster board, sheet plastic material, hardboard, plywood or such like.

As shown in FIG. 11, the upper end portions of spacers 13 have been cut away at 31 to permit the use of a bridging board 32. The provision of the bridging board 32 defines a space 33 at the top portion of the double panel which may be filled with concrete to form a beam.

In the examples illustrated in FIGS. 8 and 11, the grooves 4 shown unoccupied may have therein narrow strips similar to the strips 8 (FIG. 2) and in those examples and those illustrated in FIGS. 7, 9 and 10 the wider spacing strips 13 may be provided with slots and co-operate with strips (as shown in FIGS. 3 and 4) located in grooves in the surfaces of the slabs corresponding to the grooves 3.

Within the range of combinations set forth above a variety of walls, partitions, and floors may be constructed and erected entirely of such panels, or of such panels in combination with conventional building materials thus for example a wall may be built partly of brick and partly of panels, with the advantages of high thermal insulation, light weight, low cost and ease of manufacture and erection. Spaces between the slabs of double panels, not occupied by in situ cast concrete columns, may be filled with sand or other sound insulating material or with concrete, and other changes may be made in the panel combinations and in the novel method of building construction using such panels without departing from the invention.

I claim:
1. A composite structural panel, comprising: a slab member of light weight material having a low thermal conductivity and a low mechanical strength, said slab member having two flat spaced parallel outer faces with surrounding edge portions; one of said faces having a first series of uniformly spaced parallel outwardly opening grooves formed therein, the other of said faces having a second series of grooves formed therein similarly to said grooves of said first series, the grooves of said second series being parallel to the grooves of said second series, said grooves being of open-ended rectangular cross-sectional configuration; one of said faces having a third series of grooves formed therein which are similar to grooves of said first series and which extend perpendicularly to the grooves of said first series to provide two mutually perpendicular series of intersecting grooves; a first series of strips each disposed in one of the grooves of said first series; a second series of strips each disposed in one of the grooves of said second series; and a third series of strips each disposed in one of the grooves of said third series, the strips of said first and third series having inter-engaging notches formed therein at the locations where the grooves of said first series intersect the grooves of said third series for providing a nesting between the strips of said first and third series, all of said strips being formed of material having a greater mechanical strength than the mechanical strength of the material of said slab member for bearing mechanical loads.

2. A panel according to claim 1, wherein said grooves of said first series are staggered with respect to said grooves of said second series.

3. A panel according to claim 1, wherein said grooves of said first series are aligned with respect to said grooves of said second series.

4. A panel according to claim 1, wherein said notches in alternate strips of said first series open outwardly and said notches in the strips intermediate said alternate strips open inwardly, and in which said notches in said strips of said third series open alternately inwardly and outwardly.

5. A panel as claimed in claim 1, in which the ends of said strips project beyond at least one of said edge portions of said slab member, said panel further comprising a rigid end member abutting said edge of said slab, said end member having slots formed therein for receiving said projecting ends.

6. A panel as claimed in claim 1, in which some of said strips of said first and third series are shorter than the grooves in which they are located, at at least at one end, such that two abutting panels may be locked together by slotted locking strips placed in such unfilled portions of said grooves and engaged with strips traversing such portions.

7. A panel as claimed in claim 1, in which the outer edges of all of said strips of said first and third series and the outer edges of all of the strips of said second series lie in spaced parallel common planes.

8. A panel as claimed in claim 7, in which the edges of all of said strips project beyond said outer faces of said slab member.

9. A double panel for building purposes comprising two panels as claimed in claim 1 arranged in spaced parallel relationship with the grooves of said second series in each panel confronting each other and extending in parallel direction, and wherein at least some of the strips of said second series are common to said two panels and hold them in said spaced parallel relationship.

10. A wall including a plurality of panels each comprising two slabs of light weight material with parallel grooves in the facing surfaces of said slabs and spacing webs located in said grooves, the oppositely facing surfaces of said slabs having a first set of parallel grooves parallel to said grooves in the other surface thereof and a second set of parallel grooves at right angles to said first set of parallel grooves, and elongated strips with slots extending in from one edge located in said first and second sets of parallel grooves in mutual nesting engagement.

11. A wall including a plurality of panels in alignment and at right angles to one another, each such panel comprising two spaced parallel rectangular slabs of light weight material, parallel grooves in the facing surfaces of said slabs, spacing strips with their edges in said parallel grooves in said facing surfaces, parallel grooves in the opposite surfaces of said slabs parallel to those in the other surfaces thereof, further parallel grooves in said opposite surfaces at right angles to said parallel grooves, and strips in mutual nesting engagement in said grooves in said opposite surfaces.

12. A wall as claimed in claim 11 in which vertical members of a building framework are located in spaces between said spacing strips.

13. A wall as claimed in claim 11 in which some of the spaces between spacing strips of two slabs are filled with concrete to form columns.

14. A wall as claimed in claim 13 in which said spacing strips are short of the upper ends of said slabs and are bridged to form a channel between said slabs in which concrete is cast to form a beam.

15. A wall constructed as claimed in claim 11 in which one surface is coated with at least one layer of cementitious material for outdoor use and the other surface thereof has a covering of sheet material for indoor use.

References Cited
UNITED STATES PATENTS

| | | | |
|---|---|---|---|
| 1,345,156 | 6/1920 | Flynn | 52—426 |
| 2,578,599 | 12/1951 | Rose | 52—605 |
| 2,963,828 | 12/1960 | Belliveau | 52—564 |

FOREIGN PATENTS

| | | |
|---|---|---|
| 225,716 | 1959 | Australia. |
| 4,082 | 1909 | Great Britain. |
| 288,451 | 1928 | Great Britain. |
| 961,536 | 1964 | Great Britain. |

JOHN E. MURTAGH, *Primary Examiner.*